United States Patent
Chung

(10) Patent No.: US 7,340,284 B2
(45) Date of Patent: Mar. 4, 2008

(54) DEVICE FOR CONNECTING EAR-MICROPHONE TO MOBILE PHONE THROUGH INTERFACE CONNECTOR THEREOF

(75) Inventor: Sung-Wook Chung, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 880 days.

(21) Appl. No.: 10/460,021

(22) Filed: Jun. 11, 2003

(65) Prior Publication Data

US 2004/0137960 A1    Jul. 15, 2004

(30) Foreign Application Priority Data

Jan. 14, 2003   (KR) .................... 10-2003-0002449

(51) Int. Cl.
    *H04M 1/00* (2006.01)
(52) U.S. Cl. ................. 455/569.1; 379/420.04
(58) Field of Classification Search ............. 455/569.1
    See application file for complete search history.

(56) References Cited

U.S. PATENT DOCUMENTS 5,504,812  A  *  4/1996  Vangarde .................... 379/430
5,832,075  A  *  11/1998  Gancarcik ................... 379/377
5,978,689  A  *  11/1999  Tuoriniemi et al. ...... 455/569.1
6,792,291  B1 *  9/2004  Topol et al. ................ 455/564
6,889,043  B2 *  5/2005  Okazaki et al. ......... 455/435.13
6,922,473  B2 *  7/2005  Turnbull ...................... 381/74
2002/0177474  A1* 11/2002  Oliveira ..................... 455/574
2003/0104835  A1*  6/2003  Douhet ....................... 455/557

* cited by examiner

*Primary Examiner*—Fan Tsang
*Assistant Examiner*—Simon Sing
(74) *Attorney, Agent, or Firm*—The Farrell Law Firm, PC

(57) ABSTRACT

Disclosed is a device for connecting an ear-microphone to a mobile phone through an interface connector of the mobile phone. The phone includes a codec which has hands-free-kit audio transmission and reception terminals connected to the interface connector. A controller includes first and second interrupt terminals which are used for detecting whether the ear-microphone plug is connected, and whether a call connection/termination key of the ear-microphone is activated, respectively. A first voltage drop detector detects a first voltage drop at the corresponding connection path when the ear-microphone plug is connected through the interface connector, and outputs a first interrupt signal to the first interrupt terminal. A second voltage drop detector detects a second voltage drop at the corresponding connection path when the call connection/termination key is activated with the ear-microphone plug being connected, and outputs a second interrupt signal to the second interrupt terminal.

9 Claims, 3 Drawing Sheets

DEVICE FOR CONNECTING EAR-MICROPHONE TO MOBILE PHONE THROUGH INTERFACE CONNECTOR THEREOF

PRIORITY

This application claims priority to an application entitled "DEVICE FOR CONNECTING EAR-MICROPHONE TO MOBILE PHONE THROUGH INTERFACE CONNECTOR THEREOF", filed in the Korean Industrial Property Office on Jan. 14, 2003 and assigned Serial No. 2003-02449, the contents of which are hereby incorporated by reference.

BACKGROUND OF THE INVENTION

1. Field of the Invention

The present invention relates to a device for connecting an ear-microphone to a mobile phone through an interface connector (also referred to as an "input/output connector") of the mobile phone.

2. Description of the Related Art

Generally, two methods have been used for connecting an ear-microphone to a mobile phone (or a portable terminal). The term "ear-microphone" means a mobile phone handsfree kit incorporating an earpiece and a condenser microphone into one unit. One method is to insert a three-pole type plug into a jack of the terminal. The other is to insert a plug into an interface connector mounted on the lower surface of the terminal.

FIG. 1A is a view illustrating a connection relationship between an ear-jack 100 of a mobile phone 300 and an ear-microphone plug 200 of an ear-microphone 400. FIG. 1B is a view illustrating a connection relationship between an interface connector 140 of a mobile phone 500 and the ear-microphone plug 230 of an ear-microphone 600. In FIGS. 1A and 1B, reference numeral 250a denotes a connection/termination key, reference numeral 250b denotes a microphone, and reference numeral 260 denotes a ear phone of the ear-microphone 400 or 600.

The connection scheme of FIG. 1B can eliminate the need for the ear-jack, which may contribute to reducing the size of the mobile phone and improve its appearance. However, upon removing the ear-jack, a separate audio path must be prepared for the ear-microphone, so there are still challenges to overcome.

SUMMARY OF THE INVENTION

Therefore, it is an object of the present invention to provide a device for connecting an ear-microphone to a mobile phone through an interface connector provided in the mobile phone, without adding a separate audio path to the mobile phone.

In accordance with the present invention, the above and other objects can be accomplished by the provision of a device for connecting an ear-microphone to a mobile phone through an interface connector, the mobile phone including a codec which has hands-free-kit audio transmission and reception terminals connected to the interface connector, the device comprising:

a controller including first and second interrupt terminals, the first interrupt terminal being used for detecting whether the ear-microphone plug is connected, the second interrupt terminal being used for detecting whether a call connection/termination key of the ear-microphone is activated;

a first voltage drop detector detecting a first voltage drop at a corresponding connection path when the ear-microphone plug is connected through the interface connector, and outputting a first interrupt signal to the first interrupt terminal; and a second voltage drop detector detecting a second voltage drop at a corresponding connection path when a call connection/termination key is activated with the ear-microphone plug being connected, and outputting a second interrupt signal to the second interrupt terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1A:
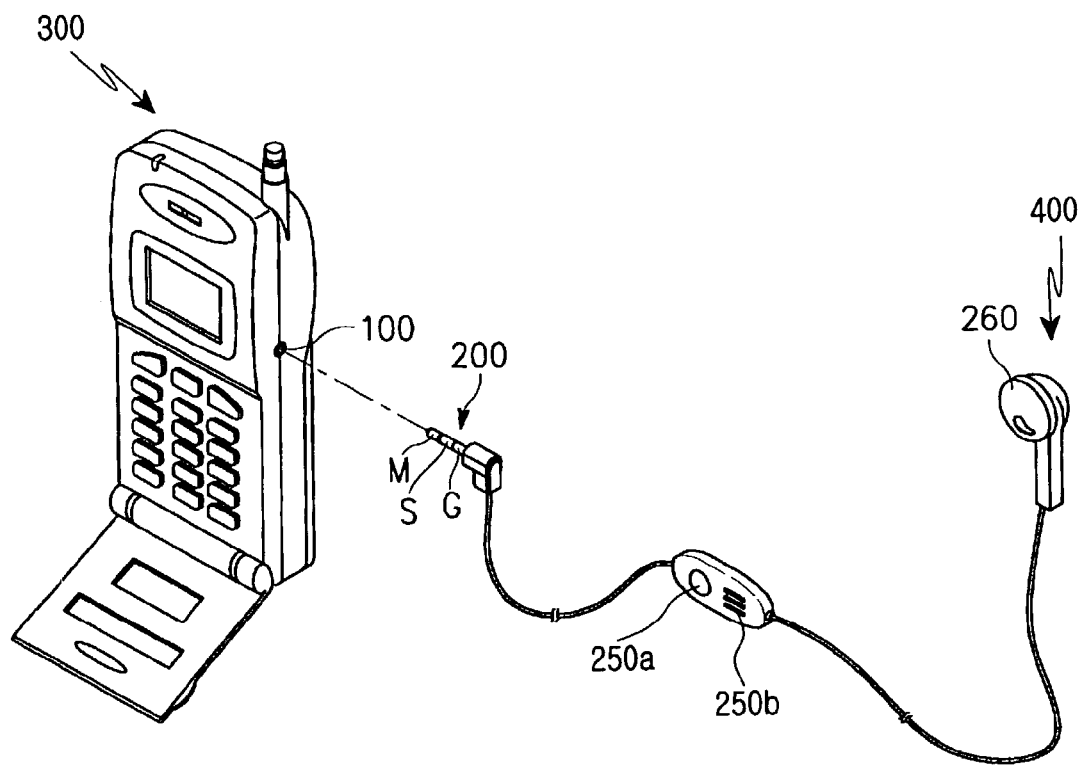
FIG. 1A illustrates a connection relationship between an ear-jack and an ear-microphone of a mobile phone.
Figure 1B:
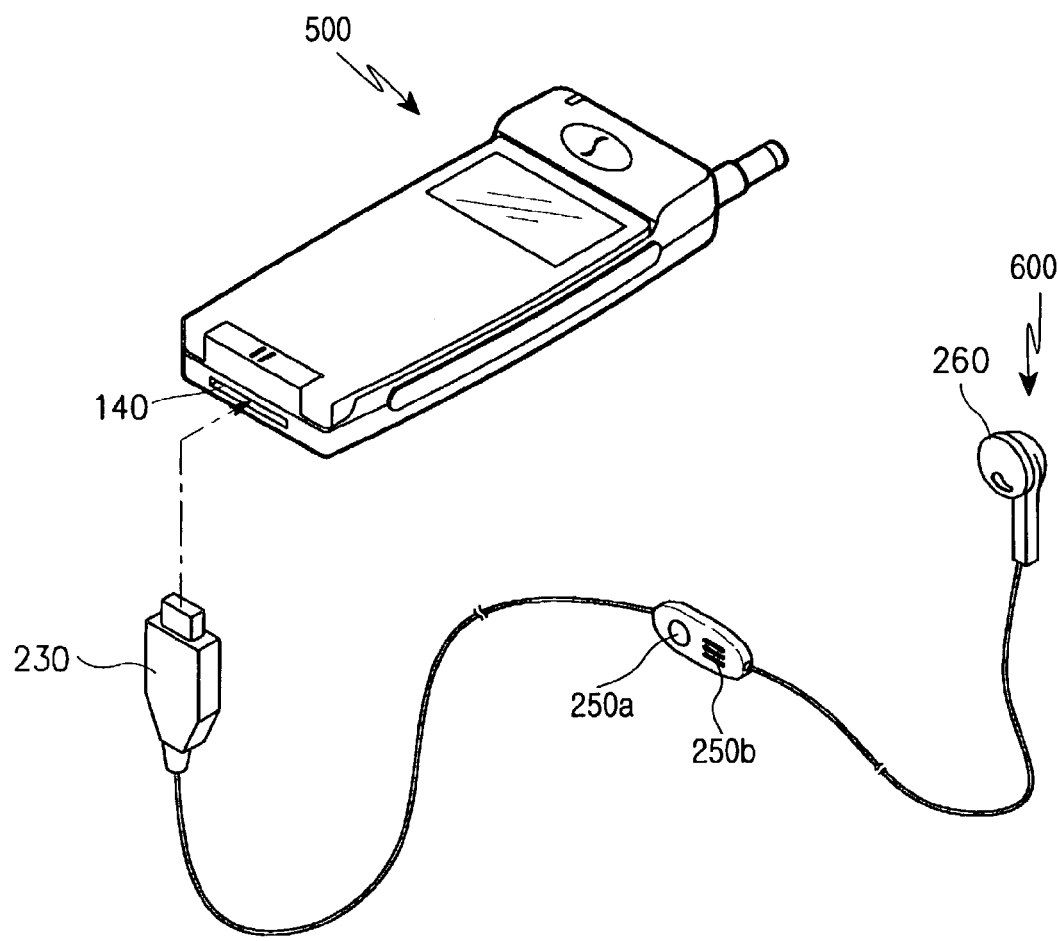
FIG. 1B illustrates a connection relationship between an interface connector and the ear-microphone of the mobile phone.

Now, preferred embodiments of the present invention will be described in detail with reference to the annexed drawings. In the drawings, the same or similar elements are denoted by the same reference numerals even though they are depicted in different drawings. In the following description made in conjunction with preferred embodiments of the present invention, a variety of specific elements are shown. The description of such elements has been made only for a better understanding of the present invention. Those skilled in the art will appreciate that the present invention can be implemented without using the above-mentioned specific elements. In the following description, a detailed description of known functions and configurations incorporated herein have been omitted where they may make the subject matter of the present invention unclear.

Figure 2:
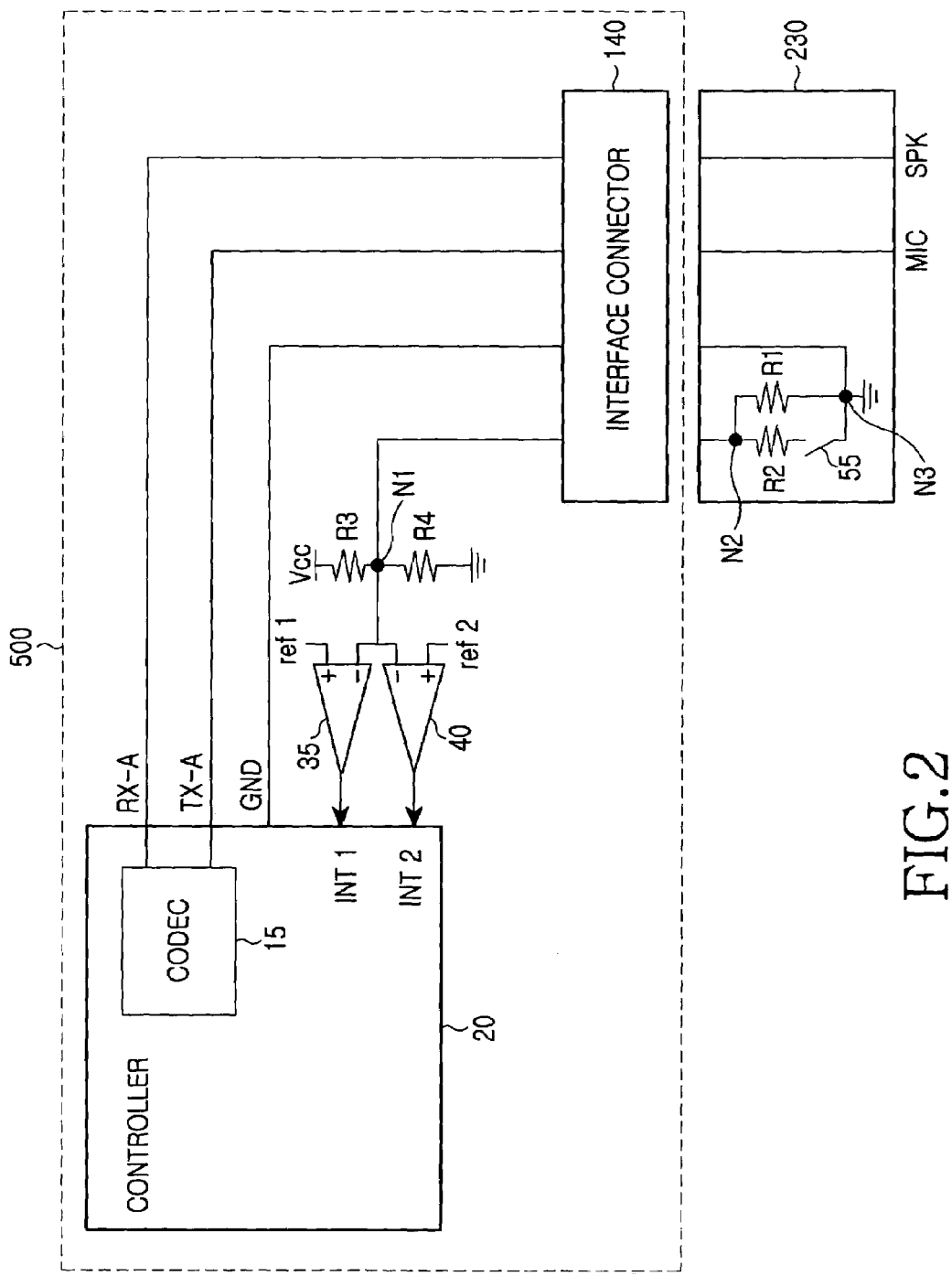
FIG. 2 is a block circuit diagram showing the configuration of a device for connecting an ear-microphone plug to a mobile phone through an interface connector, according to an embodiment of the present invention.

FIG. 2 is block circuit diagram showing the configuration of a device for connecting an ear-microphone plug to a mobile phone (or portable terminal) through an interface connector, according to an embodiment of the present invention.

Reference numeral 500 denotes a mobile phone and reference numeral 230 denotes an ear-microphone plug.

The mobile phone 500 includes a controller 20, first and second comparators 35 and 40, resistors R3 and R4, and an interface connector 140. The ear-microphone plug 230 includes resistor R1 whose one end is grounded, resistor R2 connected in parallel with resistor R1, and a switch 55 connected between resistor R2 and ground to form a current path in response to an input of a call connection/termination key (which is provided together with a speaker).

Now, a detailed description will be given of the configuration of the mobile phone 500 with regard to whether or not the ear-microphone plug 230 is connected.

A codec 15 converts a signal input from the microphone of mobile phone 500, ear-microphone 600, or handsfree-kit (not shown) into a PCM (Pulse Code Modulation) signal and also converts an audio signal in the PCM form into an analog form to be transmitted to the speaker of mobile phone 500 or handsfree-kit and the ear phone 260 of ear-microphone 600. The codec 15 includes an audio transmission terminal TX-A and an audio reception terminal RX-A for a hands-free kit, which are connected to the interface connector 140. The controller 20 includes first and second interrupt terminals INT1 and INT2. The first interrupt terminal INT1 is used for detecting a connection with the ear-microphone plug 230. The second interrupt terminal INT2 is used for detecting an input from the call connection/termination key 250a of the ear-microphone 600. In the present embodiment, it is assumed that the controller 20 is implemented by a MSM (Mobile Station Modem) Qualcomm chip, so the codec 15 is built in the controller 20 as shown in FIG. 2. Controller 20 is also connected to interface connector 140 through ground terminal GND.

The first comparator 35 serves as a first voltage drop detector. Namely, when the ear-microphone plug 230 is connected through the interface connector 140, the first comparator 35 detects a first voltage drop in the corresponding connection path between comparator 35, through node N1, and interface connector 140, and outputs a first interrupt signal to the first interrupt terminal INT1 of the controller 20. The second comparator 40 serves as a second voltage drop detector. Namely, when the call connection/termination key is activated with the ear-microphone plug 230 being connected through the interface connector 140, the second comparator 40 detects a second voltage drop in the corresponding connection path between comparator 40, through node N1, and interface connector 140, and outputs a second interrupt signal to the second interrupt terminal INT2 of the controller 20.

The operation of the two comparators 35 and 40 is described in more detail as follows.

A first reference voltage ref1 is input to a non-inverting input terminal (+) of the first comparator 35 and a voltage detected at node N1 is applied to an inverting input terminal (−) thereof. On the other hand, a second reference voltage ref2 is input to a non-inverting input terminal (+) of the second comparator 40, and a voltage detected at node N1 to an inverting input terminal (−) thereof. One end of each of resistors R3 and R4 is connected to the inverting input terminals (−) of the first and second comparators 35 and 40, respectively, and also connected to node N1. Another end of resistor R3 is connected to power source terminal Vcc, and another end of resistor R4 is connected to ground GND. The node N1, i.e., the connection point between resistors R3 and R4, is connected to the node N2, i.e., the connection point between resistors R1 and R2 of the ear-microphone plug 230, through the interface connector 140. When the ear-microphone plug 230 is not connected, the first reference voltage ref1 is lower than the voltage detected at the connection node N1 between resistors R3 and R4, and the second reference voltage ref2 is lower than the first reference voltage ref1. Thus, when the ear-microphone plug 230 is connected, resistor R1 is connected in parallel with resistor R4, and thereby the voltage detected at the node N1 becomes lower than the voltage detected when the ear-microphone plug 230 is not connected, which corresponds to the "first voltage drop". In addition, when the call connection/termination key is activated with the ear-microphone plug 230 being connected, the switch 55 is turned on, thereby connecting one end of resistor R2 to ground. Thereby, resistors R1, R2, and R4 are connected in parallel, further lowering the voltage detected at the node N1, which corresponds to the "second voltage drop". Therefore, in order to bring the first interrupt signal into a high state in the former case, the first reference voltage ref1 should be higher than the voltage detected at the node N1 in the case of the first voltage drop. Likewise, in order to bring the second interrupt signal into a high state in the latter case, the second reference voltage ref2 should be higher than the voltage detected at the node N1 in the case of the second voltage drop.

Further, when the ear-microphone plug 230 is connected to the mobile phone 500 through the interface connector 140, the ground terminal GND of the controller 20 is connected to another connection node N3 between resistors R1 and R2 of the ear-microphone plug 230, so as to be grounded.

As shown in FIG. 2, when the ear-microphone plug 230 is connected to the mobile phone 500 through the interface connector 140, the microphone terminal MIC of the ear-microphone plug 230 is connected to the hands-free-kit audio transmission terminal TX-A of the codec 15 through the interface connector 140, while the speaker terminal SPK is connected to the hands-free-kit audio reception terminal RX-A of the codec 15 through the interface connector 140. In such a manner, the present invention allows the existing hands-free-kit audio paths to be used for connecting the ear-microphone to the mobile phone, without adding a separate audio path to the mobile phone.

As apparent from the above description, according to the present invention, the ear-microphone can be connected to the mobile phone through the interface connector provided in the mobile phone (or through the existing hands-free-kit audio path), without adding a separate audio path. This allows a reduction in the number of parts of a mobile phone without degrading its functions, thereby contributing to a further reduction of the mobile phone's size.

Although a preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A device for a mobile phone to connect to an ear-microphone, the mobile phone including a codec which has hands-free-kit audio transmission and reception terminals, the device comprising:

an interface connector connecting the mobile phone to the ear microphone, the interface connector having at least four terminals which include an RX-A terminal for audio reception, a TX-A terminal for audio transmission, a GND terminal for ground, and an INT terminal for interrupt detection, the TX-A and RX-A terminals connected respectively to the hands-free-kit audio transmission and reception terminals;

a controller including first and second interrupt terminals, the first interrupt terminal used for detecting whether the ear-microphone is connected to the mobile phone, the second interrupt terminal used for detecting whether a call connection/termination key of the ear-microphone is activated;

a first voltage drop detector detecting a first voltage drop when the ear-microphone is connected through the interface connector, and outputting a first interrupt signal to the first interrupt terminal; and a second voltage drop detector detecting a second voltage drop when a call connection/termination key is activated with the ear-microphone being connected to the mobile phone, and outputting a second interrupt signal to the second interrupt terminals, wherein the INT terminal is connected to the first and second voltage drop detectors.

2. The device as set forth in claim 1, wherein when the ear-microphone is connected through the interface connector, a microphone terminal included in the ear-microphone is connected to the hands-free-kit audio transmission terminal through the interface connector, and a speaker terminal included in the ear-microphone plug is connected to the hands-free-kit audio reception terminal through the interface connector.

3. The device as set forth in claim 1, wherein the first and second voltage drop detectors are first and second comparators having first and second reference voltages, respectively.

4. The device as set forth in claim 1, wherein the ear-microphone further includes:
   a first resistor having one end grounded;
   a second resistor connected in parallel with the first resistor; and
   a switch connected between the second resistor and ground to form a current path when the call connection/termination key is activated.

5. The device as set forth in claim 4, further comprising:
   a third resistor and a fourth resistor, each having one end connected to inverting terminals of the first and second comparators, respectively,
   wherein another end of the third resistor is connected to a power source terminal,
   another end of the fourth resistor is connected to ground, and
   a connection point between the third and fourth resistors is connected to a connection point between the first and second resistors through the interface connector.

6. The device as set forth in claim 5, wherein when the ear-microphone is not connected through the interface connector, the first reference voltage is lower than a voltage detected at the connection point between the third and fourth resistors, and the second reference voltage is lower than the first reference voltage.

7. The device as set forth in claim 6, wherein when the ear-microphone is connected through the interface connector, a ground terminal of the controller is connected to another connection point between the first and second resistors, so as to be grounded.

8. The device as set forth in claim 6, wherein the first reference voltage is higher than a voltage detected at the connection node between the third and fourth resistors during the first voltage drop, and the second reference voltage is higher than a voltage detected at the connection node between the third and fourth resistors during the second voltage drop.

9. A device for a mobile phone to connect to an ear-microphone, the mobile phone including a codec which has hands-free-kit audio transmission and reception terminals, the device comprising:
   an interface connector connecting the mobile phone to the ear-microphone, the interface connector having at least four terminals which include an RX-A terminal for audio reception, a TX-A terminal for audio transmission, a GND terminal for ground, and an INT terminal for interrupt detection, the TX-A and RX-A terminals connected respectively to the hands-free-kit audio transmission and reception terminals;
   a first voltage drop detector detecting a first voltage drop at a corresponding connection path when the ear-microphone is connected through the interface connector;
   a second voltage drop detector detecting a second voltage drop at a corresponding connection path when a call connection/termination key is activated with the ear-microphone being connected, wherein the INT terminal is connected to the first and second voltage drop detectors; and
   a controller determining that the ear-microphone is connected when the first voltage drop is detected by the first voltage drop detector, and determining that the call connection/termination key of the ear-microphone is activated when the second voltage drop is detected by the second voltage drop detector,
   wherein when the ear-microphone is connected through interface connector, the hands-free-kit audio transmission and reception terminals of the codec are connected to microphone and speaker terminals of the ear-microphone, respectively, through the TX-A and RX-A terminals of the interface connector.

* * * * *